US008862538B2

(12) United States Patent
Patil et al.

(10) Patent No.: US 8,862,538 B2
(45) Date of Patent: Oct. 14, 2014

(54) MAINTAINING A NETWORK CONNECTION OF A WORKLOAD DURING TRANSFER

(75) Inventors: Sandeep Ramesh Patil, Pune (IN); Ranadip Das, Kolkata (IN); Rajeev Mishra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1430 days.

(21) Appl. No.: 12/338,543

(22) Filed: Dec. 18, 2008

(65) Prior Publication Data

US 2010/0161559 A1    Jun. 24, 2010

(51) Int. Cl.
*G06F 17/30* (2006.01)
(52) U.S. Cl.
USPC ........... 707/607; 707/609; 707/703; 709/215; 709/226
(58) Field of Classification Search
USPC ........... 707/609, 698, 607, 703; 709/215, 226
See application file for complete search history.

(56) References Cited

U.S. PATENT DOCUMENTS

| 5,797,035 | A | * | 8/1998 | Birrittella et al. | 710/35 |
|---|---|---|---|---|---|
| 6,195,689 | B1 | * | 2/2001 | Bahlmann | 709/217 |
| 6,834,296 | B2 | * | 12/2004 | Brown et al. | 709/215 |
| 2003/0167313 | A1 | * | 9/2003 | Brown et al. | 709/215 |
| 2003/0172198 | A1 | * | 9/2003 | Tiwary et al. | 710/1 |
| 2004/0221294 | A1 | * | 11/2004 | Kalmuk et al. | 719/312 |
| 2005/0229184 | A1 | * | 10/2005 | Inoue et al. | 719/310 |
| 2007/0130367 | A1 | * | 6/2007 | Kashyap | 709/245 |
| 2007/0169121 | A1 | | 7/2007 | Hunt et al. | |
| 2007/0174361 | A1 | | 7/2007 | Branda et al. | |
| 2007/0260920 | A1 | * | 11/2007 | Turner et al. | 714/17 |
| 2008/0163243 | A1 | * | 7/2008 | Kalmuk et al. | 719/312 |
| 2008/0189710 | A1 | * | 8/2008 | Kalmuk et al. | 718/102 |
| 2009/0037718 | A1 | * | 2/2009 | Ganesh et al. | 713/2 |
| 2009/0276431 | A1 | * | 11/2009 | Lind et al. | 707/8 |

* cited by examiner

*Primary Examiner* — Vincent F Boccio
(74) *Attorney, Agent, or Firm* — James L. Baudino

(57) ABSTRACT

According to one embodiment of the present disclosure, a method and technique is disclosed for maintaining a network connection during transfer of the workload from a global environment of a logical partition to a workload partition of the logical partition and during any subsequent transfer(s).

18 Claims, 6 Drawing Sheets

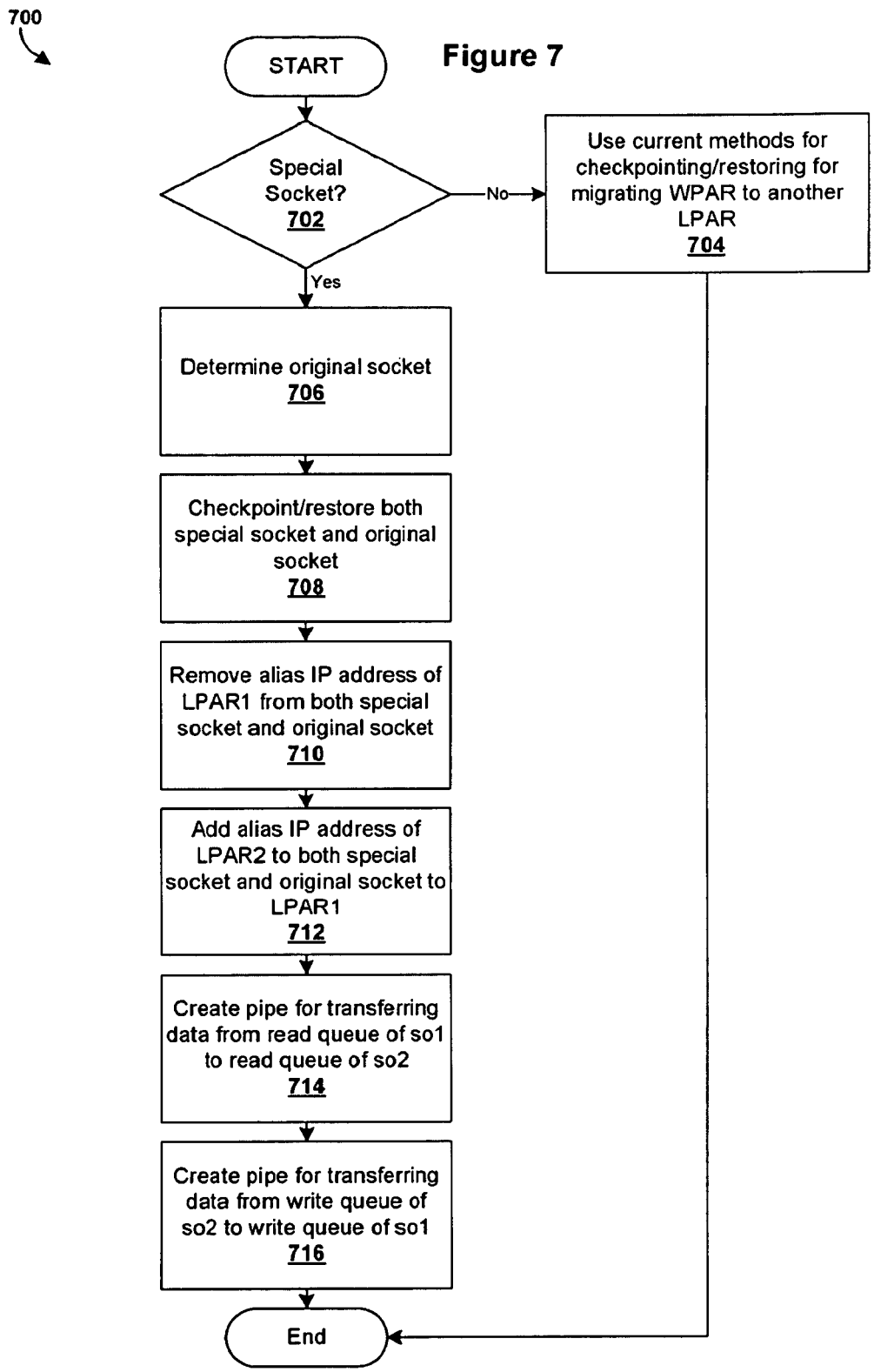

MAINTAINING A NETWORK CONNECTION OF A WORKLOAD DURING TRANSFER

BACKGROUND

In computing, a logical partition, commonly called an LPAR, is a subset of a computer's hardware resources, virtualized as a separate computer. In effect, a physical machine can be partitioned into multiple LPARs, each housing a separate operating system. Further, Workload Partitions (WPARs) may be formed in the LPARs. A WPAR is a virtualized operating system environment within a global instance of an operating system.

BRIEF SUMMARY

According to one embodiment of the present disclosure, a computer implemented method receives a request to transfer a workload from a global environment of a first logical partition to a workload partition of the first logical partition. Responsive to receiving the request, the workload is transferred from the global environment to the workload partition while maintaining a network connection of the workload during the transfer.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 7 is a flowchart of an embodiment for modifying current checkpoint and restore methods for transferring a workload partition to another logical partition.

DETAILED DESCRIPTION

Figure 1:
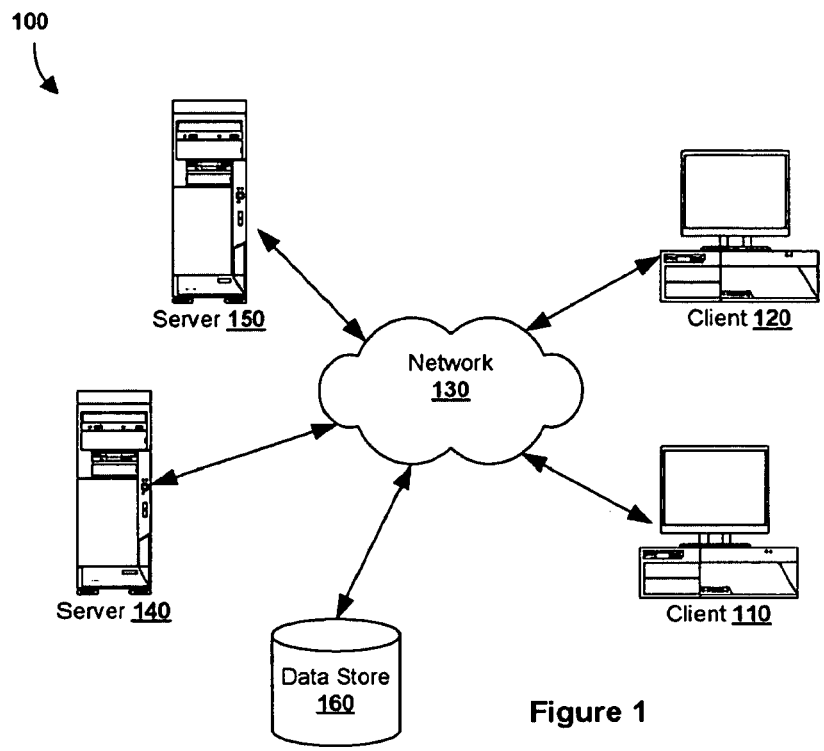
FIG. 1 is a diagram of a network of data processing systems in accordance with the disclosed embodiments.

Various embodiments of the present disclosure are directed toward a device, method and computer program product for transferring a workload from a global environment of a logical partition to a workload partition of the logical partition while maintaining a network connection of the workload during the transfer. For example, in some embodiments, the device, method and computer program product enable a workload to be transferred from a global environment of a logical partition to a workload partition of the logical partition while maintaining a network address for the workload corresponding to the global environment. As will be appreciated by one skilled in the art, the disclosed embodiments may be embodied as a method, apparatus, or computer program product. Accordingly, the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
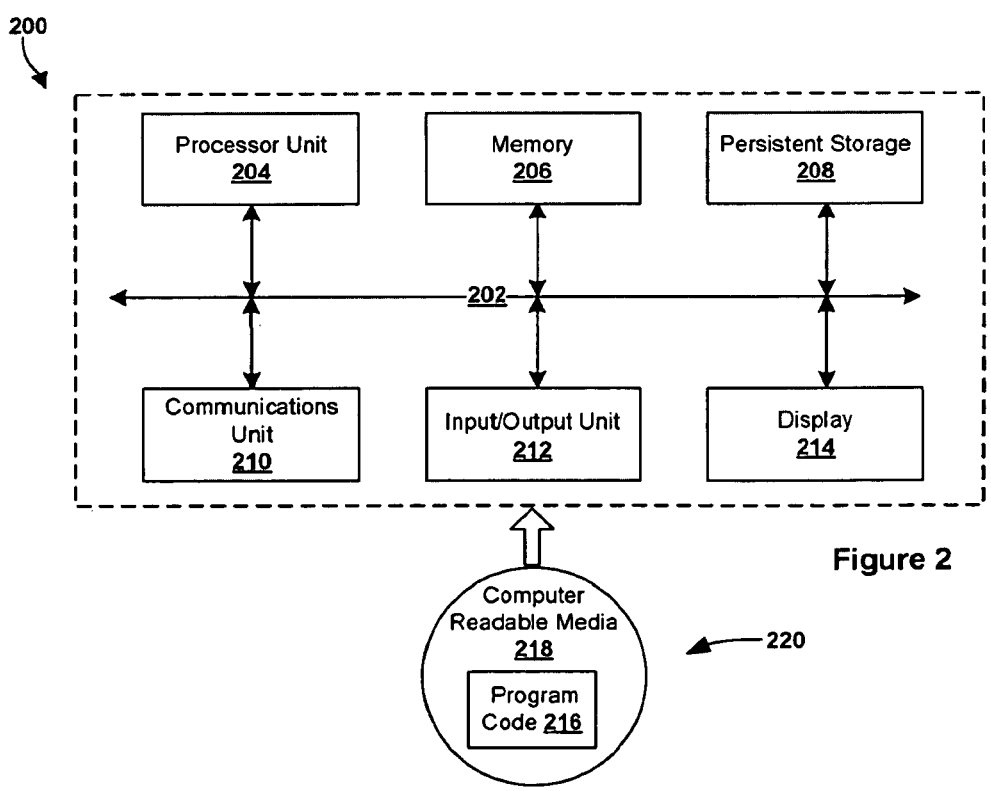
FIG. 2 is an embodiment of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® System P® servers running IBM's Advanced Interactive eXecutive (AIX®) UNIX® operating system. In addition, clients 110 and 120 connect to network 130. Clients 110 and 120 may be, for example, personal computers or network computers. In the depicted embodiment, server 140 provides data and/or services such as, but not limited to, data files, operating system images, and applications to clients 110 and 120. Network data processing system 100 may include additional servers, clients, and other devices not shown.

In the depicted embodiment, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 may also be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of an embodiment of a data processing system, such as, but not limited to, server 104, in which illustrative embodiments may be implemented. In this embodiment, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 allows for input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
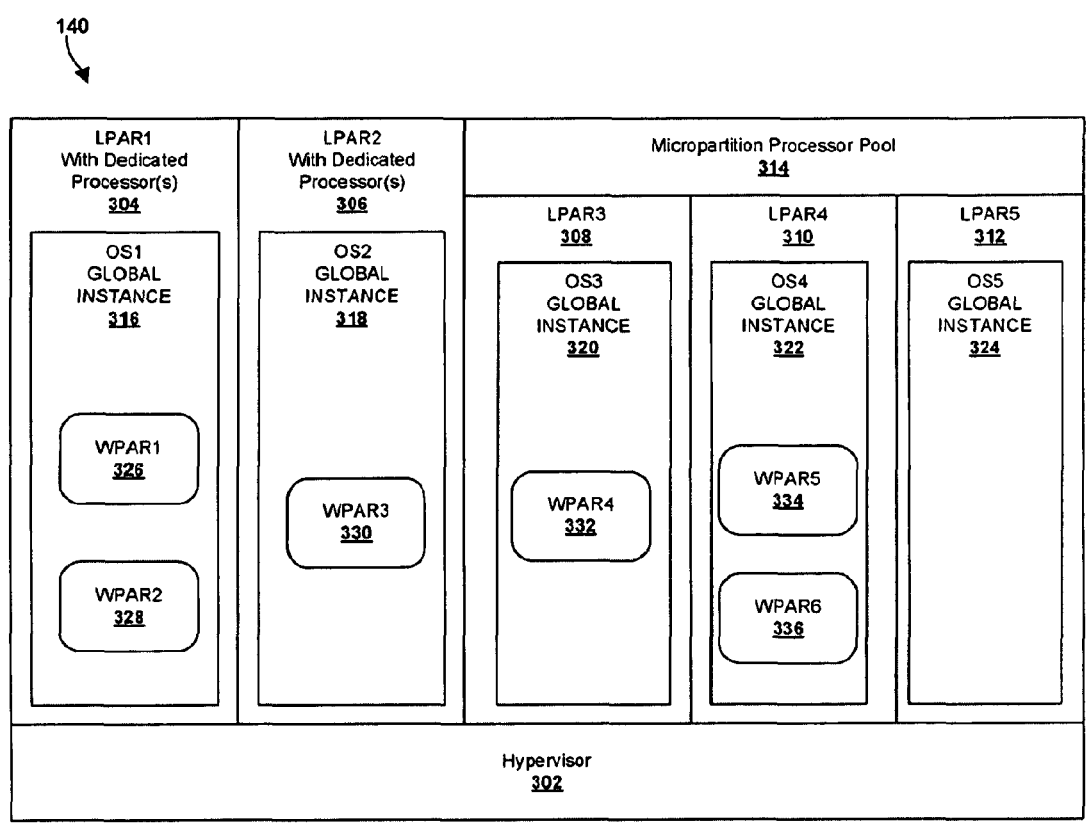
FIG. 3 is a diagram of a data processing system depicting multiple logical partitions and workload partitions.

FIG. 3 illustrates an embodiment of server 104 comprising multiple logical partitions (LPARs) such as, but not limited to, LPAR1 304, LPAR2 306, LPAR3 308, LPAR4 310, and LPAR5 312. In the depicted embodiment, LPAR1 304 and LPAR2 306 are logical partitions with dedicated processors. LPAR3 308, LPAR4 310, and LPAR5 312 are depicted as part of a micropartition processor pool 314. Micropartition processor pool 314 comprises one or more processor cores grouped together. LPAR3 308, LPAR4 310, and LPAR5 312 share the processor(s) of micropartition processor pool 314.

Hypervisor 302, also known as a virtual machine manager, is a program that allows multiple operating systems, such as OS1 316, OS2 318, OS3 320, OS4 322, and OS5 324, to share a single hardware host. Each operating system appears to have the host's processor, memory, and other system resources all to itself. However, the hypervisor is actually controlling the host processor and the system resources, and allocates the necessary resources to each operating system.

In the depicted embodiment, OS1 316, OS2 318, OS3 320, OS4 322, and OS5 324 are global instances of an operating system such as, but not limited to, the Advanced Interactive eXecutive (AIX®) UNIX® operating system. The global instance, also known as the global environment, is really no different from a standalone instance of an operating system. The global instance can be hosted within an LPAR, which can comprise either dedicated or shared processors and virtual or physical I/O. OS1 316, OS2 318, OS3 320, OS4 322, and OS5 324 owns all the physical resources of their respective logical partition. A workload partition (WPAR) is a virtualized OS environment within an instance of an operating system (e.g., an AIX® operating system). This single instance of the operating system is known as the global environment.

Within the global environment, one or more WPARs such as, but not limited to, WPAR1 326, WPAR2 328, WPAR3 330, WPAR4 332, WPAR5 334, and WPAR6 336 may be created in their respective logical partition (LPAR). As indicated above, a WPAR is a virtualized OS environment within a global instance of the operating system. Each WPAR can be separately administered from other WPARs in the system, including separate security and root level user. WPARs obtain a regulated portion of the system resources available to the global instance of the OS and share resources such as, but not limited to, kernel resource and I/O.

WPARs can be moved or transferred from one system to another without causing significant disruption to the application end user by using currently known checkpointing and restoring mechanisms. The checkpoint facility saves the current status of the WPAR and its application(s) and then restarts them at the previously saved state. During recovery, the appropriate checkpoint can be restored. However, no known method exists for moving a workload/application running in a global environment to a workload partition (WPAR) without interrupting the network communications of the workload during the move. Interruption to the network communications of the workload during the move occurs because the global environment in which the workload is presently running a different IP address than the workload partition (WPAR) in which the workload would move to. Thus, during the move, any client communicating with the workload will be disconnected and will have to be informed of the new IP address associated with the workload partition (WPAR) where the workload is moved to. The clients will then have to reconnect to the workload using the IP address of the WPAR. Accordingly, the illustrative embodiments described herein provide a computer implemented method, apparatus, and computer program product for overcoming the problems presented above.

Figure 4:
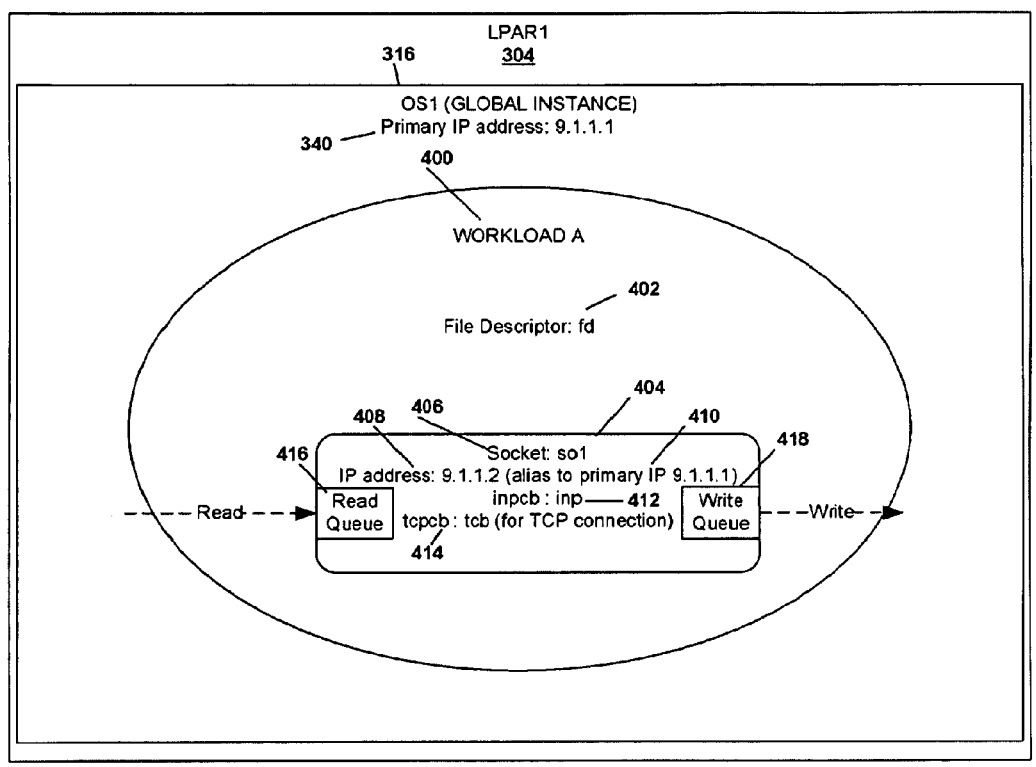
FIG. 4 is a diagram depicting a workload running in a global environment of a logical partition.

FIG. 4 is a diagram depicting an embodiment of Workload A 400 running in a global instance of OS1 316 on LPAR1 304. In the depicted example, OS1 316 has a primary IP address 340 of 9.1.1.1. File descriptor 402 is associated with Workload A 400 and is used for communicating data in and out of Workload A 400. Socket 404 is also associated with Workload A 400. A socket is one endpoint of a two-way communication link between two programs running on the network. A socket is bound to a port number so that the Transmission Control Protocol (TCP) layer can identify the application that data is destined to be sent. In the depicted example, socket 404 is associated with the name of sol (406). Socket 404 has a unique IP address 408. An IP address (or Internet Protocol address) is a unique address that certain electronic devices use in order to identify and communicate with each other on a computer network utilizing the Internet Protocol (IP) standard. In addition, an IP alias 410 is created within socket 404 to the primary IP address 340 (in this case, 9.1.1.1). IP aliasing is the process of adding more than one IP address to a network interface. An internet protocol control block (inpcb) 412 and a transmission control protocol control block (tcpcb) 414 are also associated with socket 404 to assist the OS in identifying and using socket 404 in communicating data. Socket 404 is also associated with a read queue 416 and a write queue 418 for temporarily storing incoming and outgoing data.

Figure 5:
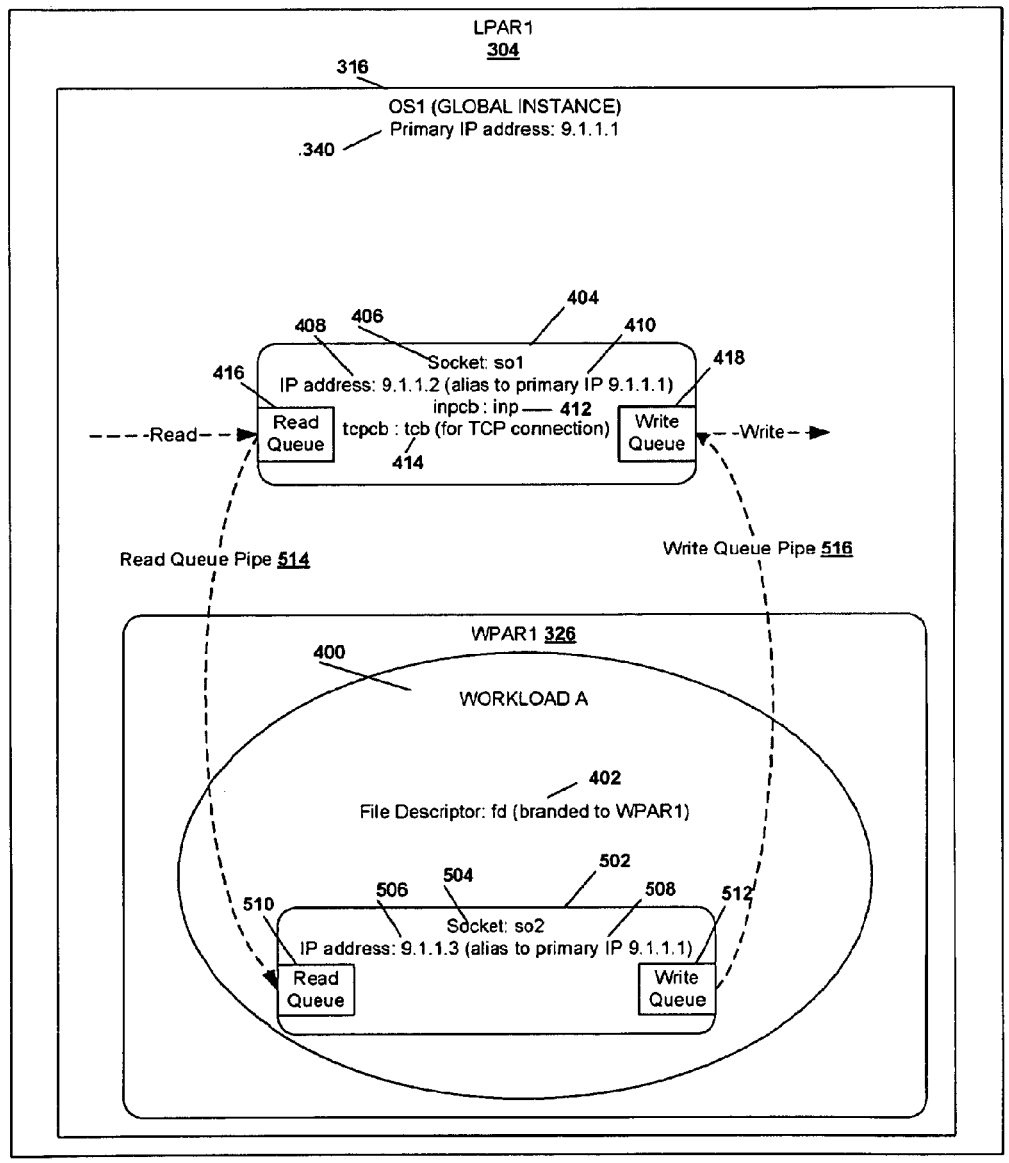
FIG. 5 is a diagram depicting the transfer of a workload from the global environment of a logical partition to a workload partition.

FIG. 5 is a diagram depicting the transferring of Workload A 400 from the global instance of OS1 316 on LPAR1 304 to a workload partition WPAR1 326. Workload A 400 is moved to WPAR1 326 by associating file descriptor 402 of workload A 400 to WPAR1 326. However, socket 404 as previously described remains associated with OS1 316.

In response to moving workload A 400 to WPAR1 326, a special socket 502 is created for communicating data to and from workload A 400 in WPAR1 326. As will be further described in later figures, socket 502 is identified as a special socket when created. A special socket is created by setting at least one variable in the socket data structure of socket 502 to indicate that socket 502 communicates data through use of another socket. Thus, a special socket as referenced herein is a socket that communicates data through use of another socket. For example, the socket data structure may be modified to add a variable called "special" and a pointer variable that points to another socket. A pointer is a data type whose value refers directly to (or "points to") another value stored elsewhere in the computer memory using its address. The default value of the "special" variable may be set to 0 and the default value for the pointer variable may be set to NULL. To indicate that a socket is special in accordance with the disclosed embodiments, the "special" variable may be changed to another number such as, but not limited to, the number one. In addition, the pointer variable would then point to the original socket that the special socket communicates through. However, other methods may be employed for indicating that the socket is special and such modification(s) are within the spirit and scope of the disclosed embodiments. For example, one may use only the pointer variable to indicate whether the socket is special. In this embodiment, if the pointer variable is not NULL then the socket will be considered special.

In the depicted embodiment, socket 502 is associated with the name so2 504. Socket 502 is associated with a new unique IP address 506. Socket 502 also creates an IP alias 508 within socket 502 to the primary IP address 340. Socket 502 is associated with a read queue 510 and a write queue 512 for temporarily storing data read in and written out by socket 502. Because socket 502 is a special socket, socket 502 will not be associated with any internet protocol control block (inpcb) or transmission control protocol control block (tcpcb) structures.

A read queue pipe 514 is created to transfer data received by socket 404 to read queue 510 of socket 502. A pipe is a technique for passing information from one program process to another. The system temporarily holds the piped information until it is read by the receiving process. However, a pipe provides communication in only one direction. Therefore, a write queue pipe 516 is created for transferring data written out by socket 502 to write queue 418 of socket 404 to be communicated through socket 404.

Accordingly, workload A 400 maintains an uninterrupted network connection for maintaining network communications with other network resources by maintaining use of the same IP address of the socket 404 while being transferred from the global instance of OS1 316 to WPAR1 326. An uninterrupted network connection, as referenced herein, means that an existing network connection between the workload and other network resources is not disrupted during transfer of the workload from a global instance of an operating system to a workload partition. In other words, network resources communicating with workload A 400 are not required to disconnect and reconnect with workload A 400 when workload A 400 is moved from a global instance of an operating system to a workload partition.

Figure 6:
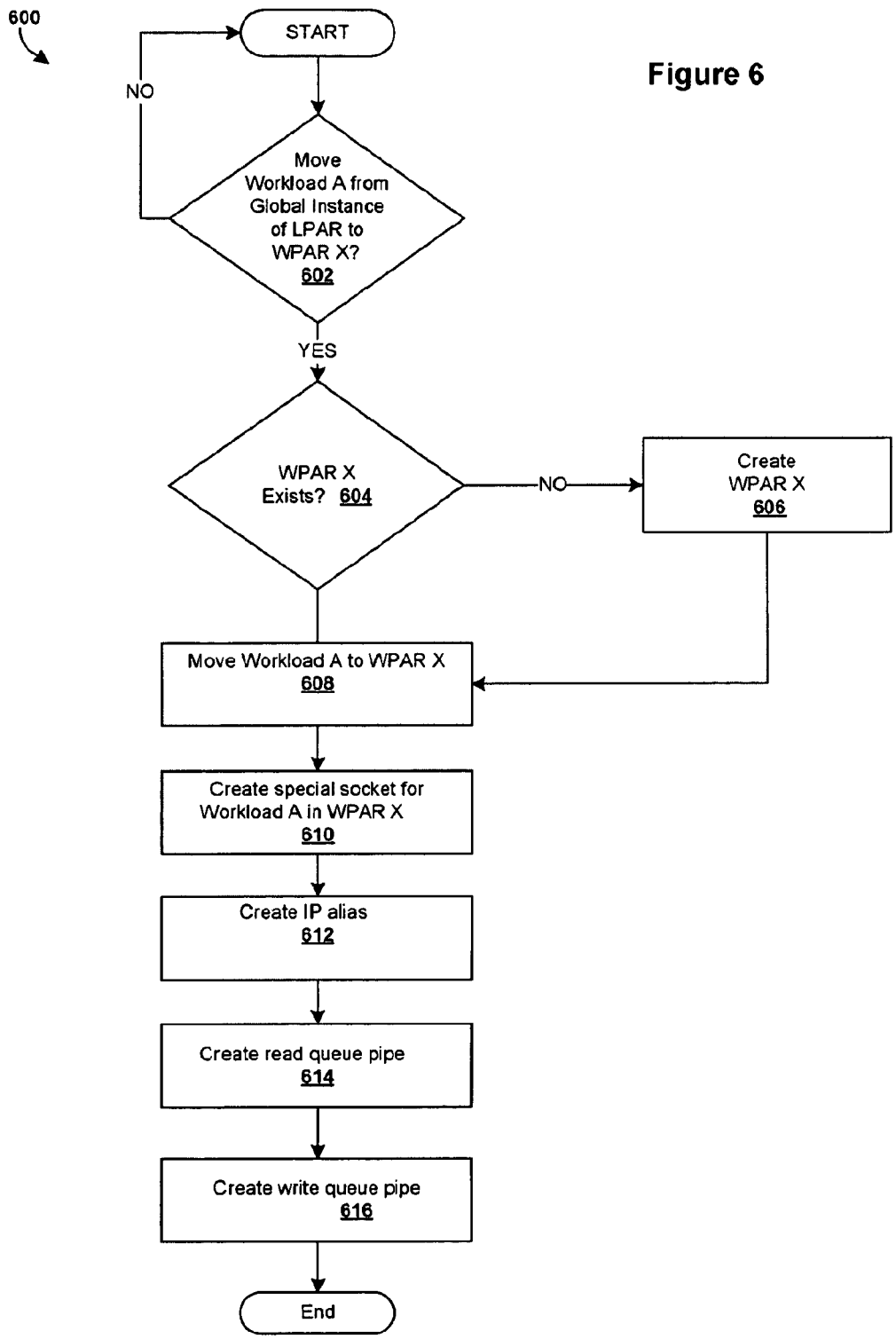
FIG. 6 is a flowchart of an embodiment for maintaining a network connection of a workload while transferring the workload from the global environment of a logical partition to a workload partition.

FIG. 6 is a flowchart of an embodiment of a method/process 600 for maintaining continuous network communications while transferring a workload A from a global instance of a logical partition (LPAR) to a workload partition X (WPAR X). Process 600 depicted may be implemented by a data processing system such as server 104 as previously described. Process 600 begins by receiving a request to move workload A from the global instance of an LPAR to a WPAR X at block 602. Upon the receipt of such a request, the process determines if WPAR X exists at block 604. If WPAR X does not exist, the process creates WPAR X using currently known techniques, at block 606. At block 608, the process moves workload A to WPAR X by associating the file descriptor of workload A to WPAR X. The process creates a special socket associated with workload A in WPAR X at block 610. The process also creates an IP alias to the primary IP address of the LPAR in the special socket at block 612. At block 614, the process creates a pipe for transferring read data received from the original socket previously associated with workload A in the global environment to the read queue of the special socket of workload A in WPAR X. At block 616, the process also creates a pipe for transferring write data from the write queue of the special socket of workload A in WPAR X to the write queue of the original socket previously associated with workload A in the global environment, with process 600 terminating thereafter. Thus, communication is maintained through the use of the original socket in the global environment while the workload is transferred to a workload partition.

As previously stated, checkpoint and restore methods currently exist for moving a workload partition (WPAR) from one logical partition (LPAR) to another. However, because the disclosed embodiments enable transferring a workload from a global environment to a workload partition (WPAR) without interrupting network communications, the checkpoint and restore methods for moving a WPAR to another LPAR are modified in view of the disclosed embodiments.

FIG. 7 is a flowchart of an embodiment of a method/process 700 for modifying the checkpoint and restore methods for transferring a WPAR from one LPAR to another LPAR. Process 700 may be implemented by a data processing system such as server 104. Process 700 begins by determining whether the WPAR to be transferred contains a workload associated with a special socket at block 702. If the WPAR to be transferred does not contain a workload associated with a special socket, then the process, at block 704, will checkpoint and restore the WPAR using currently known methods for migrating a WPAR to another LPAR, with process 700 terminating thereafter. However, if the process determines that the WPAR to be transferred contains a workload associated with a special socket, the process, at block 706, determines the original socket from which the special socket communicates through. The process then checkpoints and restores both the original socket and the workload partition (WPAR) containing the special socket to the new logical partition (LPAR) at block 708. The process removes the alias IP address associated with the previous logical partition (LPAR) from both the original socket and the special socket at block 710. At block 712, the process adds an IP alias address associated with the new logical partition (LPAR) to both the original socket and the special socket that has transferred to the new logical partition (LPAR). The process then recreates the pipes for transferring data between the original socket and the special socket in the new logical partition. Therefore, at block 714, the process creates a pipe for transferring read data received from the original socket in the new LPAR to the read queue of the special socket associated with the workload in the transferred workload partition (WPAR). The process also creates, at block 716, a pipe for transferring write data from the write queue of the special socket associated with the workload in the transferred workload partition (WPAR) to the write queue of the original socket now located in the global environment of the new logical partition. Process 700 terminates thereafter.

Thus, the disclosed embodiments present a computer implemented method for maintaining a network connection for maintaining network communications while transferring a live workload from a global instance of an operating system to a workload partition (WPAR) and further maintaining the network connection while transferring the workload partition (WPAR) associated with the transferred workload to another logical partition (LPAR). Accordingly, the disclosed embodiments provide a solution to the problems associated with losing communications during a workload transfer from a global environment to a workload partition (WPAR) and during subsequent moves.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for transferring a workload, the method comprising:
    receiving a request to transfer a running workload from a global environment of a first logical partition to a workload partition of the first logical partition, the first logical partition comprising a virtualized partition of a data processing system, the workload partition comprising a virtualized operating system environment within an instance of an operating system of the first logical partition, wherein the first logical partition comprises a first Internet Protocol (IP) address, the workload having a network connection to a network resource while in the global environment, the network resource communicating with the workload via the first IP address and using a first socket aliased to the first IP address; and
    responsive to receiving the request:
        creating a special socket in the workload partition associated with the workload, the special socket having a second IP address;
        transferring the running workload from the global environment to the workload partition; and
        transferring data associated with the running workload between the network resource and the workload by transferring the data between the first socket and the special socket while the workload is being transferred to maintain the network connection by the network resource to the workload via the first IP address while the workload is being transferred.

2. The method of claim 1, wherein transferring the workload from the global environment to the workload partition comprises associating a file descriptor of the workload with the workload partition.

3. The method of claim 1, wherein the second IP address is aliased to the first IP address.

4. The method of claim 1, wherein transferring the workload from the global environment to the workload partition comprises creating the workload partition in response to a determination that the workload partition does not currently exist.

5. The method of claim 1, further comprising creating a pointer to the first socket within the special socket.

6. The method of claim 1, further comprising:
    creating a pipe for transferring data from a read queue of the first socket to a read queue of the special socket; and
    creating a pipe for transferring data from a write queue of the special socket to a write queue of the first socket.

7. The method of claim 3, further comprising:
    receiving a request to transfer the workload partition from the first logical partition to a second logical partition; and
    transferring the workload partition from the first logical partition to the second logical partition while maintaining the network connection during transfer of the workload.

8. The method of claim 7, wherein transferring the partition from the first logical partition to the second logical partition comprises, responsive to a determination that the workload in the workload partition of the first logical partition communicates using the special socket, checkpointing and restoring both the special socket and the first socket from the first logical partition to the second logical partition.

9. The method of claim 8, further comprising:
    removing the aliasing from both the special socket and the first socket; and
    aliasing both the special socket and the first socket to a third IP address of the global environment of the second logical partition.

10. A system comprising:
    a bus system;
    memory connected to the bus system, wherein the memory includes computer usable program code; and
    a processing unit connected to the bus system, wherein the processing unit executes the computer usable program code to receive a request to transfer a running workload from a global environment of a first logical partition to a workload partition of the first logical partition, the first logical partition comprising a virtualized partition of the system, the workload partition comprising a virtualized operating system environment within an instance of an operating system of the first logical partition, wherein the first logical partition comprises a first Internet Protocol (IP) address, the workload having a network connection to a network resource while in the global environment, the network resource communicating with the workload via the first IP address and using a first socket aliased to the first IP address, and wherein the processing unit, responsive to receiving the request:
        creates a special socket in the workload partition associated with the workload, the special socket having a second IP address;
        transfers the running workload from the global environment to the workload partition; and
        transfers data associated with the running workload between the network resource and the workload by transferring the data between the first socket and the special socket while the workload is being transferred to maintain the network connection by the network resource to the workload via the first IP address while the workload is being transferred.

11. The system of claim 10, wherein the processing unit executes the computer usable program code to associate a file descriptor of the workload with the workload partition.

12. The system of claim 10, wherein the processing unit executes the computer usable program code to alias the second IP address to the first IP address.

13. The system of claim 10, wherein the processing unit executes the computer usable program code to create the workload partition in response to a determination that the workload partition does not currently exist.

14. The system of claim 10, wherein the processing unit executes the computer usable program code to create a pointer to the first socket within the special socket.

15. The system of claim 10, wherein the processing unit executes the computer usable program code to create a pipe for transferring data from a read queue of the first socket to a read queue of the special socket, and wherein the processing unit executes the computer usable program code to create a pipe for transferring data from a write queue of the special socket to a write queue of the first socket.

16. A computer program product comprising:
   a computer usable storage medium including computer usable program code for maintaining a network connection during transfer of a running workload, the computer program product comprising:
      computer usable program code for receiving a request to transfer the running workload from a global environment of a first logical partition to a workload partition of the first logical partition, the first logical partition comprising a virtualized partition of the system, the workload partition comprising a virtualized operating system environment within an instance of an operating system of the first logical partition, wherein the first logical partition comprises a first Internet Protocol (IP) address, the workload having a network connection to a network resource while in the global environment, the network resource communicating with the workload via the first IP address and using a first socket aliased to the first IP address, and computer usable program code for:
      creating a special socket in the workload partition associated with the workload, the special socket having a second IP address;
      transferring the running workload from the global environment to the workload partition; and
      transferring data associated with the running workload between the network resource and the workload by transferring the data between the first socket and the special socket while the workload is being transferred to maintain the network connection by the network resource to the workload via the first IP address while the workload is being transferred.

17. The computer program product of claim 16, wherein the computer usable storage medium includes computer usable program code for aliasing the second IP address to the first IP address.

18. The computer program product of claim 16, wherein the computer usable storage medium includes computer usable program code for:
   creating a pipe for transferring data from a read queue of the first socket to a read queue of the special socket; and
   creating a pipe for transferring data from a write queue of the special socket to a write queue of the first socket.

* * * * *